(12) United States Patent
Komatsu et al.

(10) Patent No.: US 12,495,888 B2
(45) Date of Patent: Dec. 16, 2025

(54) INTERDENTAL CLEANING TOOL

(71) Applicant: SUNSTAR INC., Takatsuki (JP)

(72) Inventors: Kazuhiro Komatsu, Takatsuki (JP); Keisuke Kato, Takatsuki (JP); Jurgen Butz, Schonau (DE)

(73) Assignee: SUNSTAR INC., Takatsuki (JP)

( * ) Notice: Subject to any disclaimer, the term of this patent is extended or adjusted under 35 U.S.C. 154(b) by 811 days.

(21) Appl. No.: 17/417,303

(22) PCT Filed: Dec. 26, 2019

(86) PCT No.: PCT/JP2019/051228
§ 371 (c)(1),
(2) Date: Dec. 16, 2021

(87) PCT Pub. No.: WO2020/138331
PCT Pub. Date: Jul. 2, 2020

(65) Prior Publication Data
US 2023/0200523 A1    Jun. 29, 2023

(30) Foreign Application Priority Data
Dec. 28, 2018    (JP) .................. 2018-248440

(51) Int. Cl.
*A61C 15/00* (2006.01)
*A46B 3/00* (2006.01)

(52) U.S. Cl.
CPC .............. *A46B 3/005* (2013.01); *A61C 15/00* (2013.01); *A46B 2200/108* (2013.01)

(58) Field of Classification Search
CPC .... A46B 3/005; A46B 2200/108; A61C 15/00
See application file for complete search history.

(56) References Cited

U.S. PATENT DOCUMENTS

| | | | |
|---|---|---|---|
| 2015/0114428 A1 | 4/2015 | Kato | |
| 2015/0257861 A1* | 9/2015 | Dishon | A46D 3/00 |
| | | | 264/243 |
| 2015/0335141 A1* | 11/2015 | Schär | A46B 5/02 |
| | | | 15/159.1 |

FOREIGN PATENT DOCUMENTS

| | | |
|---|---|---|
| DE | 102017010559 A1 * | 5/2019 |
| JP | 2016-087362 A | 5/2016 |

(Continued)

OTHER PUBLICATIONS

Machine Translation of Butz, Butz Jurgen, Interdental cleaner and injection molding device for producing an interdental cleaner, May 16, 2019, Machine Translation og Butz.*

(Continued)

*Primary Examiner* — Rachel R Steitz
*Assistant Examiner* — Karim Asqiriba
(74) *Attorney, Agent, or Firm* — Kratz, Quintos & Hanson, LLP

(57) ABSTRACT

In an interdental cleaning tool, a flexible cleaning portion including a core covering portion that covers a core base, and a plurality of recesses that are formed due to hold pins during insert molding. The recesses are formed along a longitudinal direction of the core base portion. A core base exposed portion of each recess has a shape elongated in an oblique direction that intersects both the longitudinal direction and a lateral direction orthogonal to the longitudinal direction, and, at a position where a dimension of the core base exposed portion in the longitudinal direction is maximum, the maximum dimension is 0.25 mm or less.

3 Claims, 10 Drawing Sheets

(56) References Cited

FOREIGN PATENT DOCUMENTS

| JP | 2017-118959 A | 7/2017 |
|---|---|---|
| WO | 2013/176297 A1 | 11/2013 |

OTHER PUBLICATIONS

International Search Report for International Application No. PCT/JP2019/051228 dated Feb. 4, 2020 (2 sheets, 2 sheets translation, 4 sheets total).
Extended European Search Report for corresponding European Patent Application No. 19903432.3 issued Jul. 11, 2022 (7 sheets).

* cited by examiner

EXPOSED PORTION

INTERDENTAL CLEANING TOOL

TECHNICAL FIELD

The present invention relates to an interdental cleaning tool, and more particularly, to an interdental cleaning tool having a cleaning portion covered with an elastomer.

BACKGROUND ART

As an interdental cleaning tool of this type, there has been proposed an interdental cleaning tool including: a base portion made of a synthetic resin and a flexible portion made of an elastomer and covering at least a part of the base portion, the base portion including a handle base portion and an elongated shaft-shaped core base portion connected to a distal end of the handle base portion, the flexible portion including at least a flexible cleaning portion that covers the core base portion through insert molding; and a cleaning portion for interdental cleaning, which is composed of the core base portion and the flexible cleaning portion (see Patent Literatures 1 and 2, for example).

In such an interdental cleaning tool, hold pins for fixing the base portion are used in order to form the flexible portion uniformly on the core base portion while preventing movement and deformation of the core base portion in a molding space due to pressure or heat upon an elastomer material being supplied during the insert molding. Therefore, recesses as marks of the hold pins during the insert molding are left in the flexible cleaning portion of the interdental cleaning tool.

Since the core base portion is exposed in such a recess, a tooth or dental calculus may be caught by the recess when an interdental space is cleaned. If the interdental cleaning tool is forcibly pulled out with the tooth or dental calculus being caught, the flexible cleaning portion may be peeled from the core base portion, originating from the position of the recess. Once such peeling occurs, the flexible cleaning portion is largely peeled, or even if the peeling is stopped, the peeled portion bulges at an end part thereof, which may cause a tooth or dental calculus to be caught again, resulting in further peeling.

CITATION LIST

Patent Literature

[PTL 1] International Application Publication WO2013/176297
[PTL 2] Japanese Unexamined Patent Application Publication No. 2016-87362

SUMMARY OF THE INVENTION

Problems to be Solved by the Invention

Therefore, in view of the above-described situation, an object of the present invention is to provide an interdental cleaning tool which prevents, during cleaning between teeth, a flexible cleaning portion from being easily peeled due to a tooth or dental calculus being caught by recesses that are left as marks of hold pins during insert molding, and which prevents, even if such peeling does occur, large peeling of the flexible cleaning portion and re-peeling from an end part of the peeled portion.

Solution to the Problems

The present invention encompasses the following aspects.

(1) An interdental cleaning tool, including: a base portion made of a synthetic resin, and a flexible portion made of an elastomer and covering at least a part of the base portion, the base portion including a handle base portion, and an elongated shaft-like core base portion connected to a distal end of the handle base portion, the flexible portion including at least a flexible cleaning portion that covers the core base portion through insert molding; and a cleaning portion for interdental cleaning, the cleaning portion being tapered toward a distal end thereof and being composed of the core base portion and the flexible cleaning portion. The flexible cleaning portion includes a core covering portion that covers the core base portion, and a plurality of recesses that are formed due to hold pins during the insert molding. The plurality of recesses are formed along a longitudinal direction of the core base portion, each of the recesses has a core base exposed portion with a shape elongated in an oblique direction that intersects both the longitudinal direction and a lateral direction orthogonal to the longitudinal direction, and, at a position where a dimension of the core base exposed portion in the longitudinal direction is maximum, the maximum dimension is 0.25 mm or less.

(2) The interdental cleaning tool according to the above (1), wherein a distance between geometric centers of the core base exposed portions of the recesses adjacent to each other in the longitudinal direction is 2.1 mm or less.

(3) The interdental cleaning tool according to the above (1) or (2), wherein, on a line connecting geometric centers of the core base exposed portions of the recesses adjacent to each other in the longitudinal direction, a distance between the core base exposed portions of the adjacent recesses is 0.5 mm or more.

Advantageous Effects of the Invention

According to the interdental cleaning tool of the present invention, the shape of each recess (the shape of the core base exposed portion exposed at the bottom of each recess) is a shape elongated in the oblique direction that intersects both the longitudinal direction and the lateral direction, and, at the position where the dimension of the core base exposed portion in the longitudinal direction is maximum, this maximum dimension is 0.25 mm or less. Therefore, a tooth or dental calculus is less likely to be caught by the recesses during cleaning. Even if a tooth or dental calculus is caught by a recess, it is prevented from reaching the core base exposed portion at the bottom of the recess, whereby the recess is inhibited from becoming an origin of peeling of the flexible cleaning portion.

The recess has the shape extending in the oblique direction as described above. Accordingly, even if a recess becomes the origin of peeling, a peeled portion is gradually and neatly cut along the oblique direction, as if being cut with a cutter, while contacting with a tooth or dental calculus in a point. Thus, the flexible cleaning portion is prevented from being peeled so as to be largely removed from the contact face with the core base portion. As a result, the distance and the thickness of peeling of the flexible cleaning portion can be minimized, and neat peeling is achieved such that an end part of the peeled portion is gradually thinned, thereby preventing the end part from catching a tooth or dental calculus again and from becoming an origin of peeling.

In addition, a plurality of recesses as described above are formed along the longitudinal direction of the core base portion. Thus, even if the flexible cleaning portion is largely peeled from the contact face with strong force at the origin of peeling, a peeled portion is neatly cut at a shallow position in an adjacent recess as described above, and thereafter, short and neat peeling is achieved such that a peeled portion is gradually thinned. Therefore, the amount of peeling can be reduced, and an end part of the peeled portion can be made neat such that it does not catch a tooth or dental calculus again and does not become an origin of peeling.

In particular, when the distance between the geometric centers in the core base exposed portions of the recesses adjacent to each other in the longitudinal direction is 2.1 mm or less, peeling is likely to reach the adjacent recess while it advances. Therefore, even if the flexible cleaning portion is largely peeled at the origin of peeling, peeling forward from the adjacent recess can be ended with a thin, short, and neatly peeled portion, thereby more reliably preventing the adjacent recess from catching a tooth or dental calculus again and from becoming an origin of peeling.

Moreover, if the length, along the longitudinal direction, of the core covering portion between recesses is short, the flexible cleaning portion composed of the core covering portion is torn and becomes an origin of further peeling. Meanwhile, when, on a line connecting the geometric centers in the core base exposed portions of the recesses adjacent to each other in the longitudinal direction, the distance between the core base exposed portions of the adjacent recesses is 0.5 mm or more. With this distance, the aforementioned disadvantage can be avoided, and neat peeling as described above can be performed more reliably. Therefore, the amount of peeling can be reduced, and an end part of a peeled portion can be made neat such that it does not catch a tooth or dental calculus again and does not become an origin of peeling.

Figure 14:
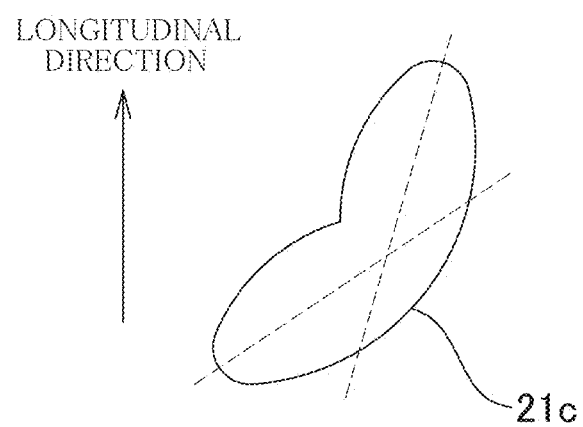

(a) and (b) of FIG. 14 show other modifications of the shape of the recess.

DESCRIPTION OF EMBODIMENTS

Next, an embodiment of the present invention will be described in detail with reference to the accompanying drawings.

Figure 1:
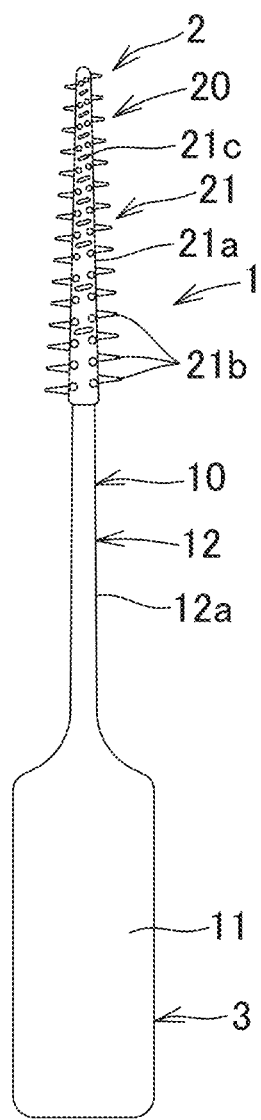
FIG. 1 is a front view schematically showing an interdental cleaning tool according to an embodiment of the present invention.

As shown in FIG. 1, an interdental cleaning tool 1 according to the present invention includes, in terms of functionality, a cleaning portion 2 for interdental cleaning and a handle portion 3 serving as a handle, and includes, in terms of material, a base portion 10 made of a synthetic resin and a flexible portion 20 made of an elastomer and covering at least a part of the base portion 10.

The base portion 10 includes a flat and elongated plate-like handle base portion 11 constituting the handle portion 3, and an elongated shaft-like core base portion 12 connected to a distal end of the handle base portion 11. The handle base portion 11 is formed in the shape of a flat and elongated plate, but may be formed in any other shape such as a bar shape having a circular, oval, or polygonal cross section, for example, as long as the handle base portion 11 can be easily held by hand to clean between teeth. Also, the handle base portion 11 being smoothly continuous to the core base portion 12, and the handle base portion 11 being curved in a plan view are preferable examples.

The core base portion 12 is formed in the shape of a substantially straight and elongated shaft. The core base portion 12 has, on a grip portion side thereof, an exposed portion 12*a* that is exposed to the outside, and has, on a distal end side thereof, a core main body 12*b* that is covered with an elastomer and can be inserted between teeth. The configuration of the core base portion 12 is not particularly limited, but the core base portion 12 is preferably formed in a tapered shape, the diameter of which decreases toward the distal end side thereof. With such a tapered shape, insertability of the cleaning portion between teeth can be improved, and an additional advantage that, during interdental cleaning, a user can gently massage interdental papillae in embrasures of different sizes by using one interdental cleaning tool, can also be achieved. More preferably, an angle θ of the tapered shape with respect to the center line in the longitudinal direction of the core base portion 12 is set to 0.2° to 2.5°, and further preferably, 0.2° to 1.8°.

The diameter of a distal end part of the core main body 12*b* is set to 0.4 mm to 0.6 mm, and the diameter of a proximal end part of the core main body 12*b* is set to 0.8 mm to 2.0 mm. A core covering portion 21*a* of the flexible cleaning portion 21 has a diameter D of a curved end part at the distal end thereof, and the diameter D is set to 0.5 to 1.2 mm Thus, the distal end part, of the core main body 12*b*, extending at least 5 mm from its distal end can be reliably inserted between teeth.

While the angle θ formed by the tapered shape of the core base portion 12 is set to be constant over the entire length of the core base portion 12, the angle θ may be set to be reduced continuously or stepwise toward the distal end side of the core base portion 12. Alternatively, the exposed portion 12*a* may be formed in a shaft shape having the same diameter over the entire length thereof, and only the core main body 12*b* may be formed in a gently tapered shape, the diameter of which decreases toward the distal end thereof.

Still alternatively, the exposed portion 12a may be omitted so that the core main body 12b is directly connected to the handle base portion 11.

Examples of synthetic resin materials that can be used for the base portion 10 include thermoplastic synthetic resin materials such as polypropylene (PP), polybutylene terephthalate (PBT), polyethylene, polyethylene terephthalate, polycyclohexylene dimethylene terephthalate, saturated polyester resins, polymethyl methacrylate, cellulose propionate, polyurethane, polyamide, polycarbonate, and acrylonitrile butadiene styrene (ABS). In particular, polypropylene (PP) and polybutylene terephthalate (PBT) are preferred because these materials prevent breakage of the base portion 10. Most preferred is polypropylene that is low in molding temperature, can reduce a cycle time to improve productivity, and imposes less heat load on molding equipment.

Additives such as fiber materials and minerals may be added to the synthetic resin material forming the base portion 10. Examples of the fiber materials include glass fiber, carbon fiber, and aramid fiber. Examples of the minerals include talc and mica.

The flexible portion 20 is molded integrally with the base portion 10 through insert molding using an elastomer material, and includes at least the flexible cleaning portion 21 externally fitted to the core base portion 12. However, as a flexible portion 20, an annular insertion regulation portion may be provided on the proximal end part of the core main body 12b to regulate insertion of the core main body 12b between teeth, or an anti-slip portion may be provided on the handle base portion 11.

The flexible cleaning portion 21 includes: the core covering portion 21a that covers the core base portion 12; multiple protrusions 21b that are formed integrally with the core covering portion 21a so as to protrude outward, at intervals in the longitudinal direction of the core base portion 12; and a plurality of recesses 21c that are formed between the plurality of protrusions 21b of the core covering portion 21a so as to have a shape elongated in a direction intersecting the longitudinal direction.

If the thickness of the core covering portion 21a is too large, the diameter of the core main body 12b covered by the core covering portion 21a needs to be reduced. This disadvantageously causes the cleaning portion to be significantly reduced in rigidity when the cleaning portion is inserted between teeth, and moreover, raises the possibility that Karman vortex is generated during molding and the cleaning portion is significantly affected by the Karman vortex. If the thickness of the core covering portion 21a is too small, the elastomer material cannot fill the cleaning portion 2 up to the proximal end part thereof. Therefore, the thickness of the core covering portion 21a is preferably set to 0.08 mm to 0.2 mm.

Figure 12:
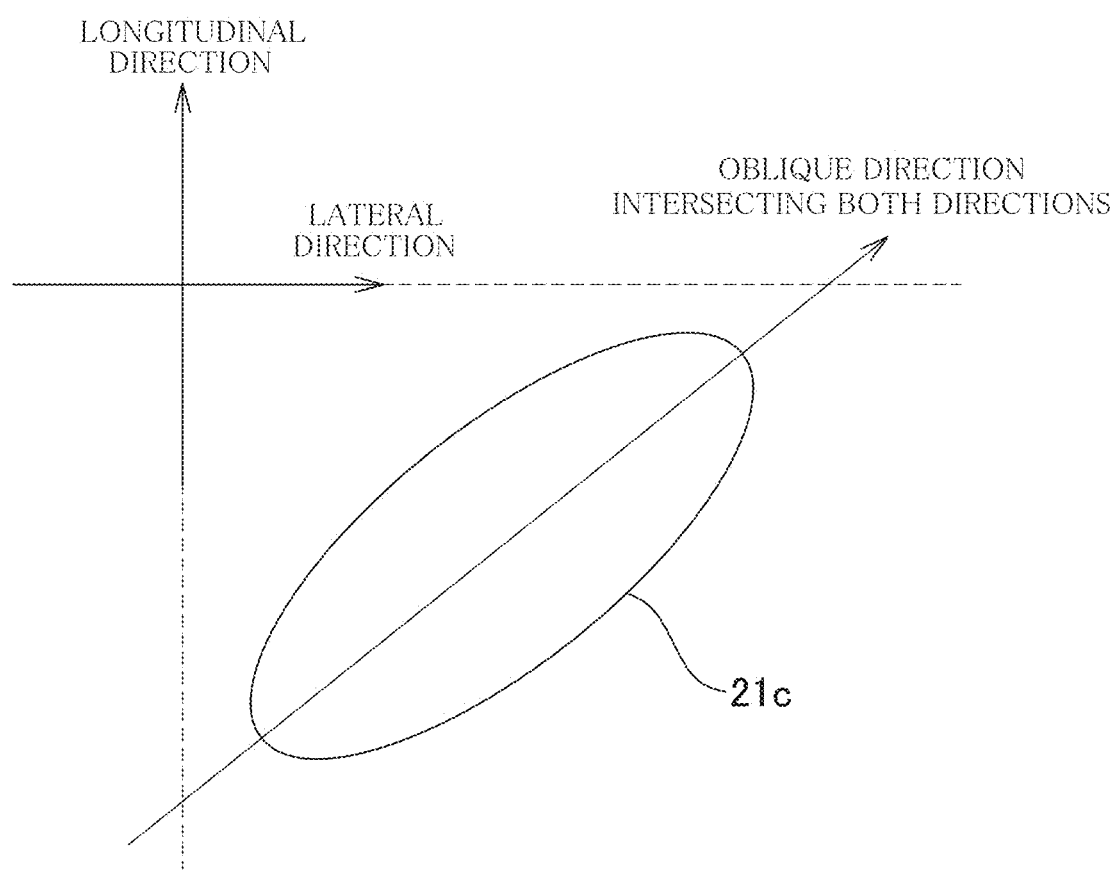
FIG. 12 is an explanatory view showing the shape of a recess.
Figure 13A:
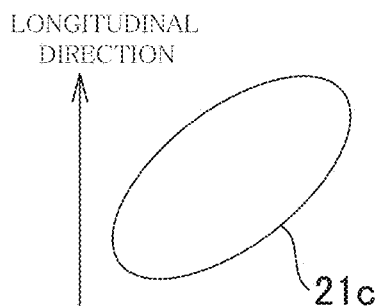
FIGS. 13A to 13K show modifications of the shape of the recess.
Figure 13B:
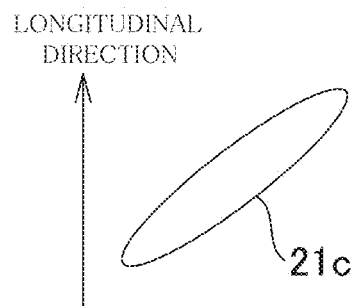
Figure 13C:
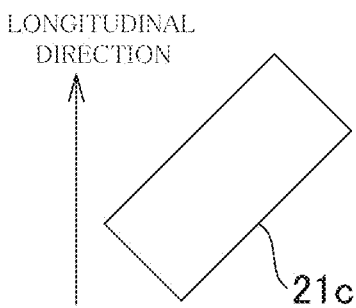
Figure 13D:
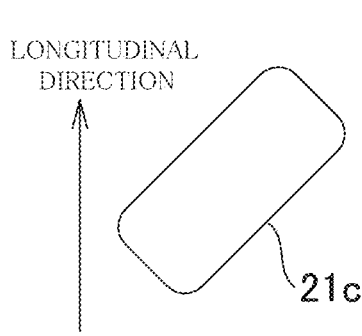
Figure 13E:
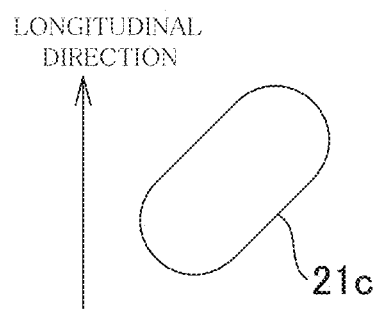
Figure 13F:
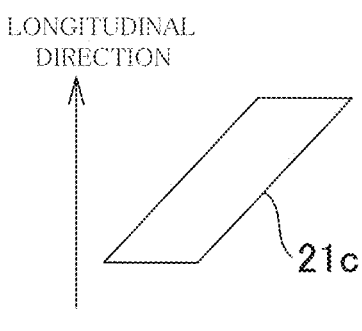
Figure 13G:
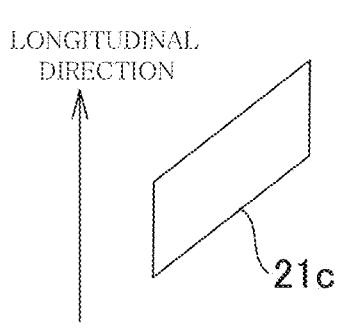
Figure 13H:
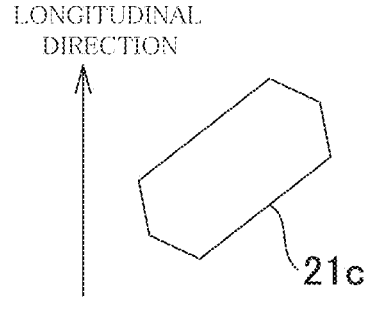
Figure 13I:
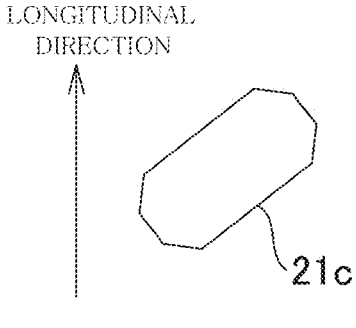
Figure 13J:
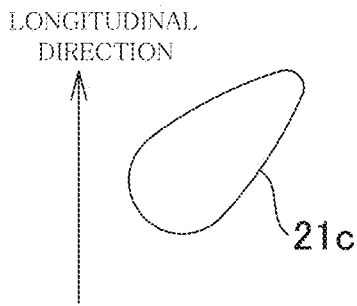
Figure 13K:
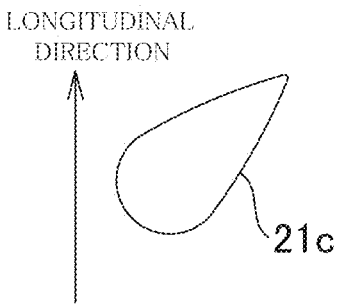

The plurality of recesses 21c are formed between the plurality of protrusions 21b of the core covering portion 21a. At a bottom face of each recess 21c, the outer peripheral surface of the core base portion 12 (core base exposed portion 210) supported by hold pins are exposed. The core base exposed portion 210 of each recess 21c has a shape elongated in an oblique direction intersecting both the longitudinal direction of the core base portion 12 (core covering portion 21a) and a lateral direction orthogonal to the longitudinal direction as shown in FIG. 12. In this embodiment, the core base exposed portion 210 has a shape obtained by forming the opposed ends of a rectangle elongated in the oblique direction, into an oval or an arc shape. However, the shape of the core base exposed portion 210 is not limited thereto and may be selected from among various shapes such as oval (FIGS. 13A and 13B), rectangle (FIG. 13C), almost rectangle (FIG. 13D), oval like a barrel shape (FIG. 13E), parallelogram (FIGS. 13F and 13G), hexagon (FIG. 13H), octagon (FIG. 13I), egg shape (teardrop shape) (FIGS. 13J and 13K), other substantially polygonal shapes, and a deformed shape (e.g., FIG. 14).

More specifically, the shape of the core base exposed portion 210 of each recess 21c is defined such that, at a position where the dimension of the core base exposed portion 210 along the longitudinal direction of the core base portion 12 is maximum, this maximum dimension A1 is preferably 0.25 mm or less, and more preferably, 0.22 mm or less. When the core base exposed portion 210 at the bottom of the recess 21c is as thin as 0.25 mm or less, a tooth or calculus is less likely to be caught by the recess 21c during cleaning. Even if such catching occurs, the tooth or calculus is prevented from reaching the core base exposed portion, thereby inhibiting the recess 21c from becoming an origin of peeling of the flexible cleaning portion. The recess 21c may become an origin of peeling. Even in such a situation, the recess has the shape extending in the oblique direction as described above, so that a peeled portion is gradually and neatly cut along the oblique direction, as if being cut with a cutter, while contacting with the tooth or dental calculus in a point. Therefore, the flexible cleaning portion is prevented from being peeled and largely removed from the contact face with the core base portion.

A plurality of recesses 21c as described above are disposed in lines along the longitudinal direction of the core covering portion 21a. In the present embodiment, the lines of recesses 21c are formed on two side surfaces of the core covering portion 21a, i.e., a side surface and another side surface on the circumferentially opposite side of the side surface. The lines of recesses 21c may be formed on three or more side surfaces. Assuming that both the dimensions of the exposed portion 210 in the longitudinal direction and in the lateral direction are maximum at a center position g1 in the core base exposed portion 210 of each recess 21c, a distance L1 between the center positions g1 of adjacent recesses 21c among the recesses 21c forming each line is set to 2.1 mm or less. As such, the distance between the adjacent recesses is set to 2.1 mm or less. Accordingly, even if the core covering portion 21a (flexible cleaning portion) is peeled due to a tooth or dental calculus being caught by a recess 21c, this peeling is likely to reach an adjacent recess in the middle of peeling. Therefore, even if the core covering portion 21a is largely peeled at the origin of peeling, peeling forward from the adjacent recess can be ended with a thin, short, and neatly peeled portion, thereby more reliably preventing the adjacent recess 21c from catching a tooth or dental calculus again and from becoming an origin of peeling.

A distance L2 between the core base exposed portions 210 on a line connecting the center positions g1 in the core base exposed portions 210 of the adjacent recesses 21c (i.e., a dimension, on the line, of the flexible cleaning portion existing between the core base exposed portions 210) is 0.5 mm or more. This prevents the flexible cleaning portion from being torn and becoming an origin of further peeling. Thus, neat peeling as described above can be realized more reliably.

Examples of the elastomer forming the flexible portion 20 include: thermoplastic elastomers such as styrene-based elastomer, olefin-based elastomer, polyamide-based elastomer (e.g., nylon-based elastomers having, as hard segments, nylon 6, nylon 6-6, nylon 6-10, nylon 6-12, and the like), urethane-based elastomer, and fluorine-based elastomer; and thermosetting elastomers such as silicone rubber, natural rubber, and synthetic rubber. In particular, the elastomer material is preferably compatible with the synthetic resin material forming the base portion 10. For example, if the base portion 10 is formed of polypropylene, the flexible portion 20 is preferably formed of olefin-based elastomer or styrene-based elastomer.

A method for manufacturing the interdental cleaning tool according to the present invention is as follows. That is, at least a part of the core base portion of the base portion is set in a molding space of a metal mold for molding the flexible portion. Then, two or more parts in the longitudinal direction of the core base portion, including the distal end part and the proximal end part of the core base portion, are respectively held at a substantially center of a flexible cleaning portion molding section, by using at least two pairs of hold pins, each pair including two hold pins that are opposed to each other and protrude into the flexible cleaning portion molding section so as to be substantially orthogonal to matching faces of the metal mold. In this state, an elastomer material is supplied to the molding space such that the flexible cleaning portion molding section is filled with the elastomer material from the distal end side toward the proximal end side thereof, thereby molding the flexible portion.

The flexible cleaning portion molding section of the metal mold used in the above process includes: a core covering portion molding section for molding the core covering portion that covers the core base portion; and multiple protrusion molding sections for molding multiple protrusions so as to be formed integrally with the core covering portion and protrude outward, at intervals in the longitudinal direction of the core base portion. The hold pins each have a tip shape elongated in a direction intersecting the longitudinal direction of the core base portion, and are arranged so as to protrude into the flexible cleaning portion molding section from the core covering portion molding section between the protrusion molding sections. Thus, a plurality of recesses elongated in the direction intersecting the longitudinal direction are formed between the plurality of protrusions of the core covering portion, at positions where the hold pins hold the core base portion.

A tip surface, of each hold pin, abutting on the core base portion 12 may be a flat surface orthogonal to the axial direction of the hold pin. Alternatively, the tip surface may be an arc surface along the outer peripheral surface of the core base portion 12, or an arc surface having a curvature smaller than that of the outer peripheral surface. The tip surface along the outer peripheral surface is preferable because holdability for the core base portion is further improved.

While the present invention has been described based on the embodiment, the present invention is not limited to the embodiments in any way. It will be understood that numerous modifications and variations can be devised without departing from the gist of the present invention.

EXAMPLES

A plurality of types of samples of interdental cleaning tools were prepared and subjected to a peeling test under the same condition. Each sample includes, in the same manner as the present invention: a base portion formed of a synthetic resin and a flexible portion formed of an elastomer and covering at least a part of the base portion, the base portion including a handle base portion and an elongated shaft-like core base portion connected to a distal end of the handle base portion, the flexible portion including at least a flexible cleaning portion that covers the core base portion through insert molding; and a cleaning portion for interdental cleaning, which is composed of the core base portion and the flexible cleaning portion and is tapered toward a distal end thereof.

Samples

Figure 2:
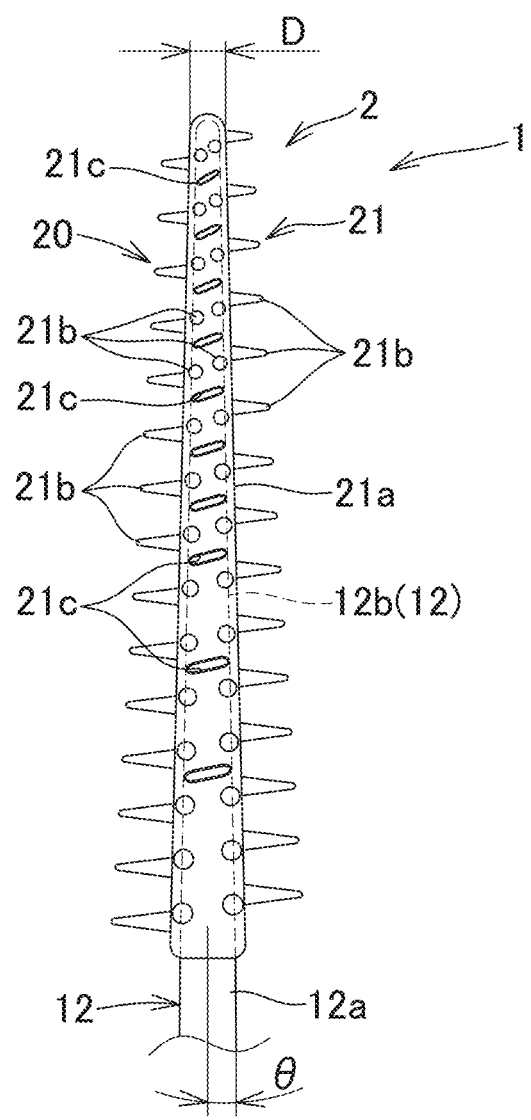
FIG. 2 is an explanatory view showing a cleaning portion of the interdental cleaning tool.
Figure 3:
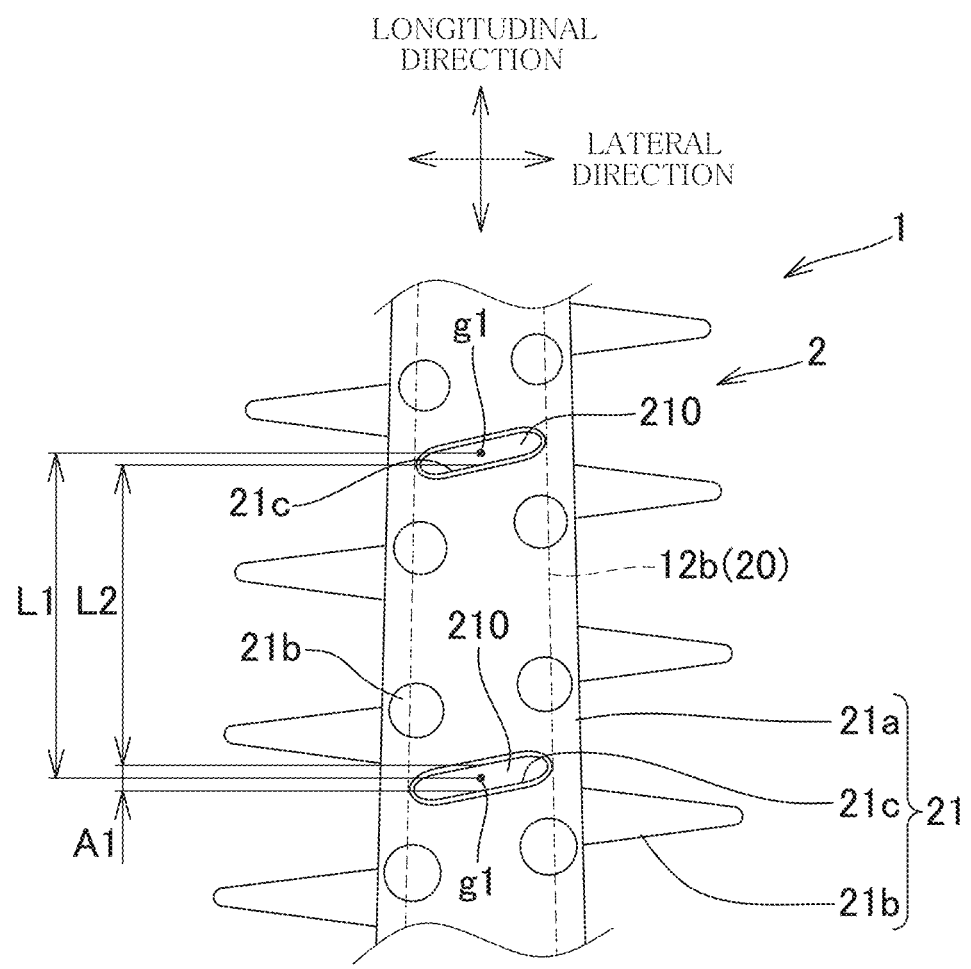
FIG. 3 is an explanatory view showing a major part of the cleaning portion.
Figure 5:
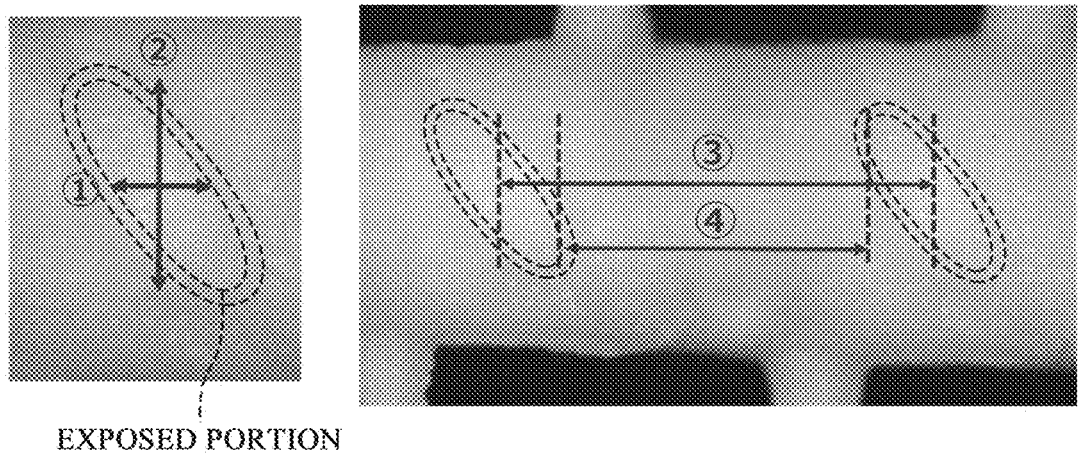
FIG. 5 shows an enlarged photograph of a sample of Example 1 with numbers indicating dimensions.
Figure 6:
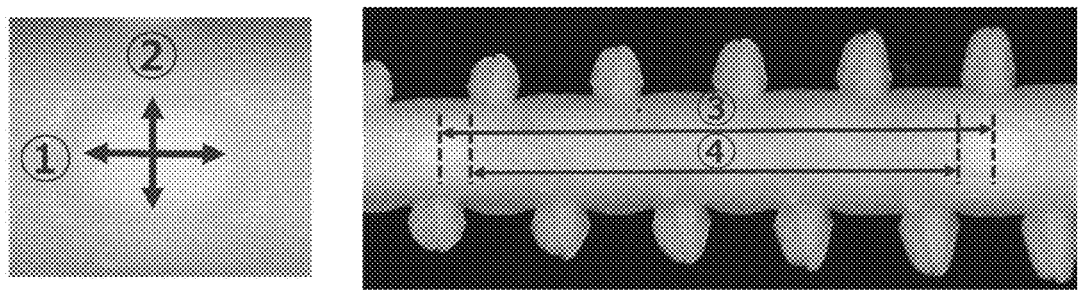
FIG. 6 shows an enlarged photograph of a sample of Comparative Example 1 with numbers indicating dimensions.
Figure 7:
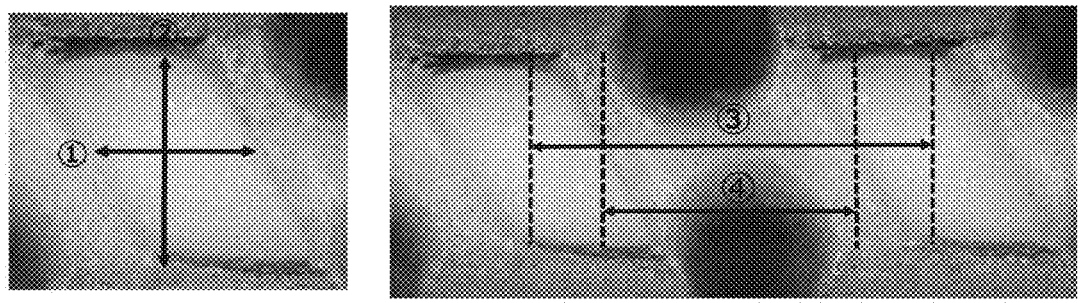
FIG. 7 shows an enlarged photograph of a sample of Comparative Example 2 with numbers indicating dimensions.
Figure 8:
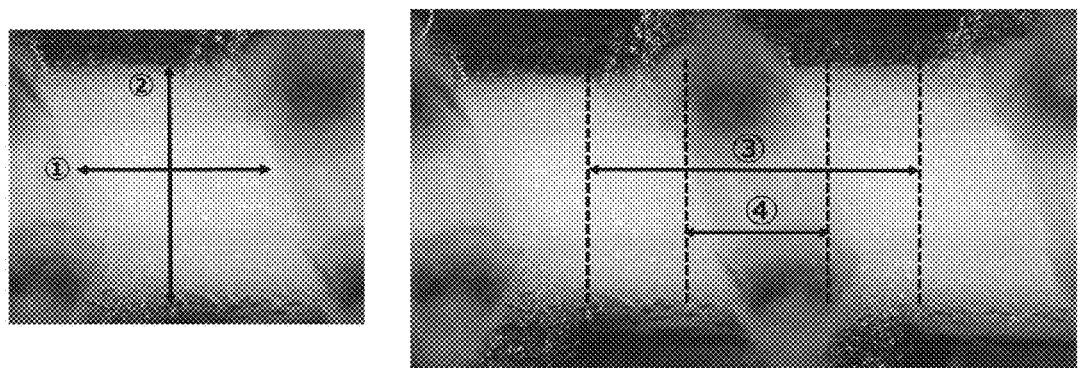
FIG. 8 shows an enlarged photograph of a sample of Comparative Example 3 with numbers indicating dimensions.

Samples of the interdental cleaning tools prepared include: Example 1 (FIG. 5) that is an interdental cleaning tool according to the representative embodiment of the present invention (FIGS. 1 to 3); Comparative Example 1 (FIG. 6) in which a core base exposed portion at the bottom of a recess has a circular (barrel-like) shape; Comparative Example 2 (FIG. 7) that is an interdental cleaning tool manufactured by Create Co., Ltd. in which a core base exposed portion at the bottom of a recess has a parallelogram shape; and Comparative Example 3 (FIG. 8) that is an interdental cleaning tool manufactured by a company named "Reach" in which a core base exposed portion at the bottom of a recess has a parallelogram shape. For each of Example 1 and Comparative Examples 1 to 3, a plurality of interdental cleaning tools of the same configuration were prepared. These samples were fixed onto a paper with a stapler at different positions corresponding to recesses, and subjected to a peeling test. In the peeling test, each sample was pulled out toward the proximal end side, i.e., the handle base portion side, while holding the paper so as not to move.

The inclination angle of the outer shape of the core covering portion with respect to the longitudinal direction of the cleaning portion was 1.60 in Example 1 and Comparative Example 1, 0.7° in Comparative Example 2, and 1.1° in Comparative Example 3. Each of the samples of Example 1 and Comparative Examples 1 to 3 had a plurality of recesses forming a line on one side surface, and the number of the recesses was ten in Example 1, three in Comparative Example 1, twelve in Comparative Example 2, and twelve in Comparative Example 3. As for the dimensions of the respective recesses and the distances between adjacent recesses, dimensions indicated by numbers in FIGS. 5 to 8 differed among the recesses. The specific dimensions are described in Tables 1 to 4 below.

TABLE 1

| Ex. 1 | 1st recess | 2nd recess | 3rd recess | 4th recess | 5th recess | 6th recess | 7th recess | 8th recess | 9th recess | 10th recess |
|---|---|---|---|---|---|---|---|---|---|---|
| Longitudinal direction ① (mm) | 0.21 | 0.21 | 0.22 | 0.22 | 0.20 | 0.20 | 0.18 | 0.19 | 0.18 | 0.20 |
| Lateral direction ② (mm) | 0.70 | 0.77 | 0.82 | 0.87 | 0.87 | 0.88 | 0.99 | 0.92 | 1.01 | 1.03 |
| Inter-recess | 1.01 | | | | | | | | | |

TABLE 1-continued

| Ex. 1 | 1st recess | 2nd recess | 3rd recess | 4th recess | 5th recess | 6th recess | 7th recess | 8th recess | 9th recess | 10th recess |
|---|---|---|---|---|---|---|---|---|---|---|
| distance ③ (mm) | | 1.01 | 1.01 | 0.98 | 0.99 | 1.00 | 0.98 | 2.01 | 1.97 | |
| Inter-recess distance ④ (mm) | 0.80 | 0.79 | 0.79 | 0.77 | 0.79 | 0.81 | 0.80 | 1.83 | 1.78 | |

TABLE 2

| Com. Ex. 1 | 1st recess | 2nd recess | 3rd recess |
|---|---|---|---|
| Longitudinal direction ① (mm) | 0.46 | 0.56 | 0.44 |
| Lateral direction ② (mm) | 0.34 | 0.46 | 0.47 |
| inter-recess distance ③ (mm) | 4.44 | | 4.26 |
| Inter-recess distance ④ (mm) | 3.93 | | 3.76 |

TABLE 3

| Com. Ex. 2 | 1st recess | 2nd recess | 3rd recess | 4th recess | 5th recess | 6th recess | 7th recess | 8th recess | 9th recess | 10th recess | 11th recess | 12th recess |
|---|---|---|---|---|---|---|---|---|---|---|---|---|
| Longitudinal direction ① (mm) | Not measurable | 0.22 | 0.24 | 0.27 | 0.27 | 0.31 | 0.33 | 0.35 | 0.32 | 0.35 | 0.33 | 0.34 |
| Lateral direction ② (mm) | | 0.30 | 0.31 | 0.33 | 0.36 | 0.37 | 0.42 | 0.45 | 0.48 | 0.50 | 0.54 | 0.55 |
| Inter-recess distance ③ (mm) | 1.14 | 1.10 | 1.14 | 1.12 | 1.14 | 1.09 | 1.17 | 1.12 | 1.11 | 1.15 | 1.08 | |
| Inter-recess distance ④ (mm) | 0.87 | 0.87 | 0.88 | 0.85 | 0.84 | 0.77 | 0.83 | 0.79 | 0.78 | 0.81 | 0.74 | |

TABLE 4

| Com. Ex. 3 | 1st recess | 2nd recess | 3rd recess | 4th recess | 5th recess | 6th recess | 7th recess | 8th recess | 9th recess | 10th recess | 11th recess | 12th recess |
|---|---|---|---|---|---|---|---|---|---|---|---|---|
| Longitudinal direction ① (mm) | 0.53 | 0.57 | 0.55 | 0.57 | 0.56 | 0.56 | 0.56 | 0.56 | 0.55 | 0.55 | 0.55 | 0.53 |
| Lateral direction ② (mm) | 0.94 | 0.92 | 0.96 | 0.93 | 0.95 | 0.97 | 0.90 | 0.95 | 0.93 | 0.95 | 0.98 | 0.98 |
| Inter-recess distance ③ (mm) | 1.04 | 1.01 | 1.02 | 1.00 | 1.01 | 1.01 | 1.02 | 1.00 | 1.01 | 0.99 | 1.02 | |
| Inter-recess distance ④ (mm) | 0.49 | 0.45 | 0.46 | 0.44 | 0.45 | 0.45 | 0.46 | 0.45 | 0.46 | 0.44 | 0.48 | |

Test Method

Figure 4:
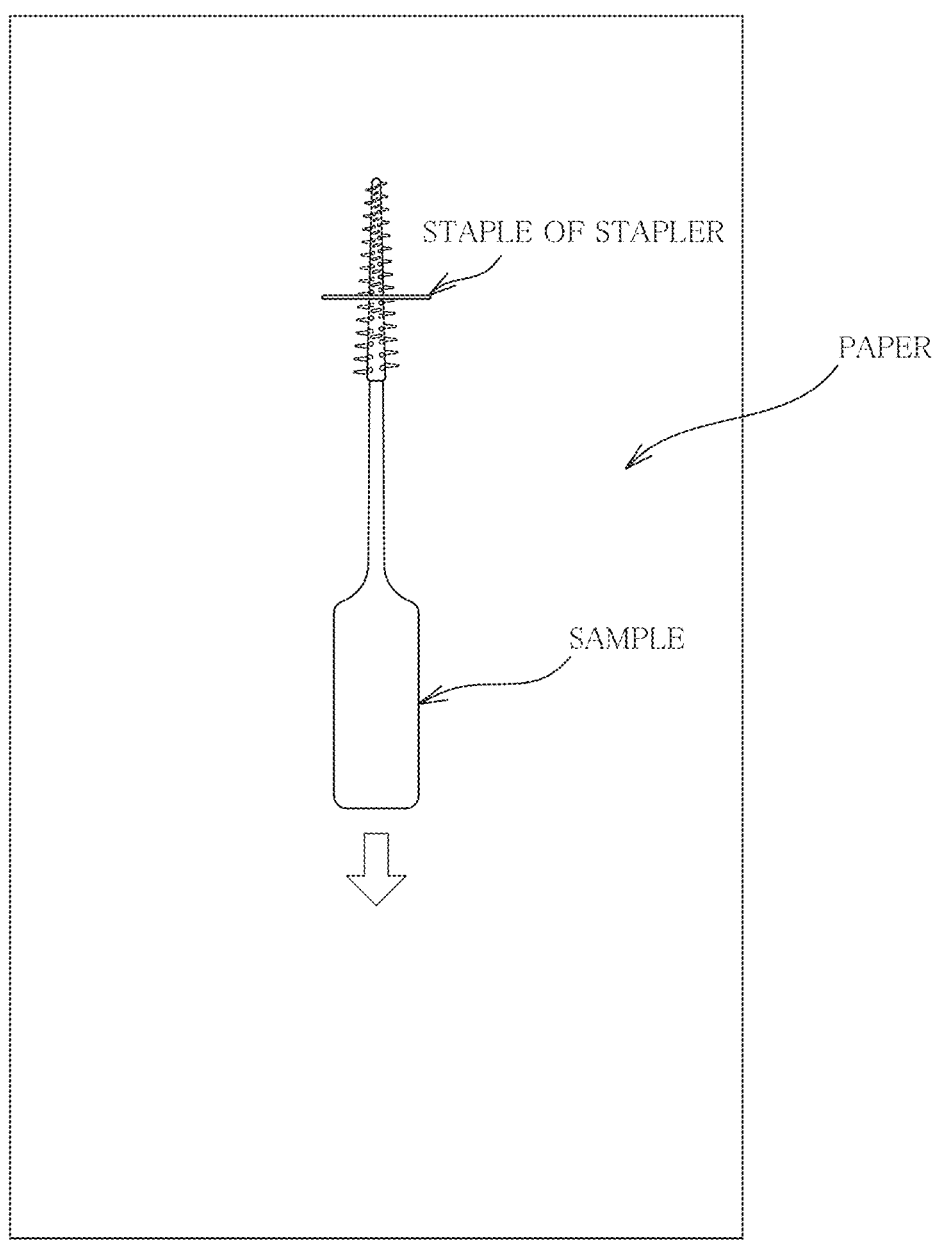
FIG. 4 is an explanatory view illustrating a method of a peeling test.

In the peeling test, as shown in FIG. 4, each of the samples was fixed onto a paper with a staple of a stapler, at the position of a recess among a plurality of recesses, so that the recess was compulsorily made to be an origin of peeling of the flexible cleaning portion. In this state, the interdental cleaning tool was pulled out toward the proximal end side, and the state of peeling of the flexible cleaning portion starting from the recess was analyzed. The staples of the stapler conform to JIS S 6036-1992 by Japanese Industrial Standards, and the thickness (width) thereof is 0.48 mm. The thickness of the paper is 0.80 mm.

Analysis Method

The analysis was performed by measuring the distance and the area of peeling from each recess in the longitudinal direction with a digital microscope (VHX-600 manufactured by Ketence Corp.). Moreover, the traces of peeling from certain recesses were photographed with a laser microscope (VK-X150 manufactured by Keyence Corp.) (microscopic analysis images shown in FIGS. 9 to 11 described later). Table 5 below shows the distance and the area of peeling. In Comparative Example 3, the flexible cleaning portion between recesses was easily moved and torn, and therefore, measurement was not possible.

TABLE 5

|  | Origin recess | Peeling distance (mm) | Peeling area (mm²) |
|---|---|---|---|
| Ex. 1 | 4th recess | 1.40 | 0.89 |
|  | 5th recess | 1.57 | 0.96 |
|  | 6th recess | 1.41 | 0.89 |
|  | 7th recess | 1.48 | 0.77 |
|  | 8th recess | 1.40 | 0.80 |

TABLE 5-continued

|  | Origin recess | Peeling distance (mm) | Peeling area (mm²) |
|---|---|---|---|
|  | 9th recess | 2.60 | 1.51 |
|  | 10th recess | 2.98 | 1.71 |
| Com. Ex. 1 | 2nd recess | 4.46 | 2.60 |
|  | 3rd recess | 4.34 | 2.61 |
| Com. Ex. 2 | 2nd recess | 1.38 | 1.04 |
|  | 3rd recess | 1.52 | 1.22 |
|  | 4th recess | 1.59 | 1.33 |
|  | 5th recess | 1.86 | 1.38 |
|  | 6th recess | 1.78 | 1.39 |
|  | 7th recess | 1.87 | 1.43 |
|  | 8th recess | 1.85 | 1.45 |
|  | 9th recess | 1.54 | 1.31 |
|  | 10th recess | 1.76 | 1.40 |
|  | 11th recess | 1.86 | 1.47 |
|  | 12th recess | 1.48 | 1.29 |

Consideration

As can be seen from the results of Table 5, in Example 1 and Comparative Example 2, regardless of which recess is an origin of peeling, peeling is ended at a position apart from the origin by about 1.5 times the distance between the recesses. Meanwhile, in Comparative Example 1, even though the distance between the recesses is relatively long, peeling is not ended until reaching an adjacent recess, i.e., peeling is ended at the position of the adjacent recess.

That is, in Example 1 and Comparative Example 2 in which the core base exposed portion has a shape elongated in the oblique direction and the distance between the center positions in the core base exposed portions is about 0.9 to 2.1 mm, even if deep peeling occurs from a recess 21c, this peeling reaches an adjacent recess while the peeling advances. Then, a peeled portion is gradually cut along the oblique direction at the adjacent recess, as if being cut with a cutter, while contacting with a tooth or dental calculus in a point. Thereafter, peeling continues toward a next adjacent recess, but ends before reaching the recess.

When the flexible cleaning portion between the recesses is short as in Comparative Example 3, the flexible cleaning portion is peeled off from the core base portion and moved significantly. Therefore, the peeled portion cannot be cut along the oblique direction as described above, but is torn. From the above, it is found that the distance between the core base exposed portions of the recesses adjacent to each other in the longitudinal direction, on the line connecting the center positions, in the core base exposed portions of the adjacent recesses, at which both the dimensions in the longitudinal direction and the lateral direction of the exposed portion passing the center positions are maximum, is preferably set to 0.5 mm or more, and more preferably, 0.7 mm or more.

Figure 9:
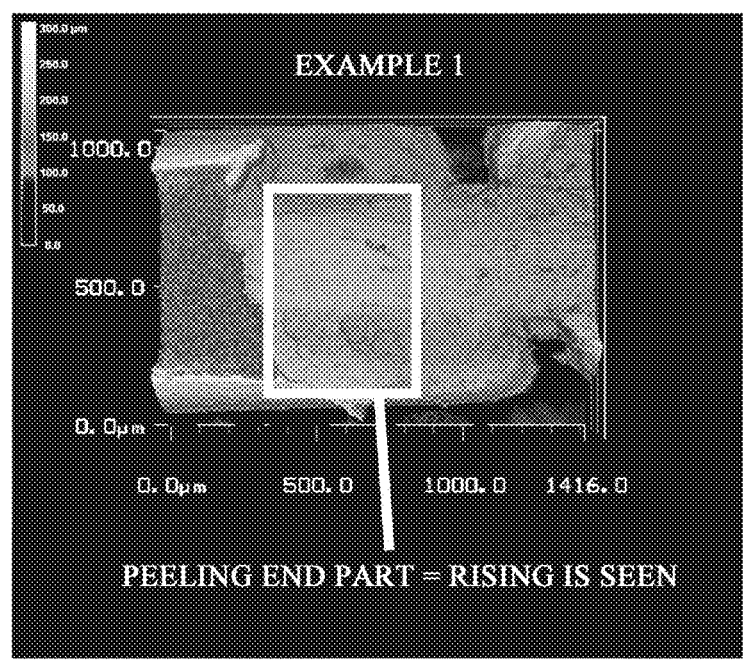
FIG. 9 shows a microscopic analysis image obtained by shooting the sample of Example 1 after peeling (from an eighth recess).
Figure 10:
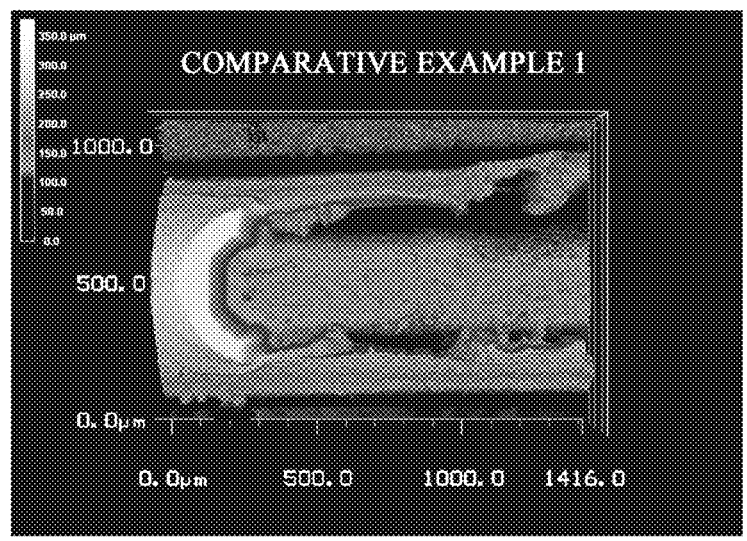
FIG. 10 shows a microscopic analysis image obtained by shooting the sample of Comparative Example 1 after peeling (from a second recess).
Figure 11:
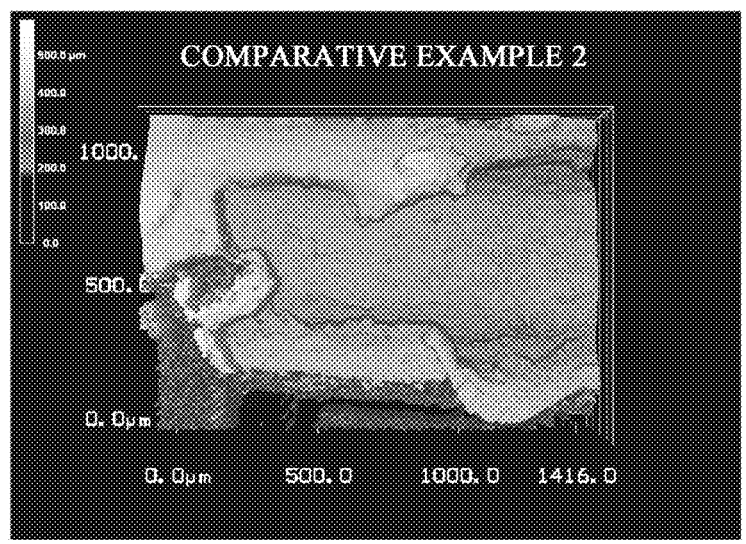
FIG. 11 shows a microscopic analysis image obtained by shooting the sample of Comparative Example 2 after peeling (from a fourth recess).

As can be seen from the microscopic analysis images of end portions of peeling shown in FIGS. 9 to 11, peeling is ended with a peeled portion being gradually thinned between the recesses in Example 1, whereas peeling is ended with a peeled portion that is not thinned but stepwise in Comparative Example 1 and Comparative Example 2. These images show the end portions of peeling from specific recesses (8th recess in the image of Example 1 (FIG. 9), 2nd recess in the image of Comparative Example 1 (FIG. 10), and 4th recess in the image of Comparative Example 2 (FIG. 11)). Here, in each Example, similar tendencies were observed for the end portions of peeling from other recesses. The above results lead to the following considerations. That is, in Example 1, the peeled portion is neatly cut as if being cut with a cutter at the recess adjacent to the recess from which peeling has occurred, and thereafter, peeling is neatly ended with a peeled portion being gradually thinned. Meanwhile, in Comparative Example 1, such cutting does not occur because the adjacent recess is circular in shape, and peeling is ended with a peeled portion bulging like a step.

In Comparative Example 2, at a position where the dimension of the core base exposed portion of the recess along the longitudinal direction of the cleaning portion is maximum, this maximum dimension is greater than that in Example 1. Therefore, in the recess adjacent to the recess from which peeling has occurred, the staple of the stapler moves again to the bottom side of the adjacent recess, and the entire cleaning portion is unstably shifted. In this case, neat cutting as in Example 1 does not occur in the adjacent recess, and as a result, peeling is ended in a stepwise manner even between the recesses. It is found that the maximum dimension of the core base exposed portion along the longitudinal direction of the cleaning portion is preferably set to 0.25 mm or less, and more preferably, 0.22 mm or less, as in Example 1.

DESCRIPTION OF THE REFERENCE CHARACTERS 1 interdental cleaning tool
2 cleaning portion
3 handle portion
10 base portion
11 handle base portion
12 core base portion
12a exposed portion
12b core main body
20 flexible portion
21 flexible cleaning portion
21a core covering portion
21b protrusion
21c recess
210 core base exposed portion

The invention claimed is:

1. An interdental cleaning tool, comprising:
a base portion made of a synthetic resin, and a flexible portion made of an elastomer and covering at least a part of the base portion,
the base portion including a handle base portion, and an elongated shaft-like core base portion connected to a distal end of the handle base portion,
the flexible portion including at least a flexible cleaning portion that covers the core base portion through insert molding; and
a cleaning portion for interdental cleaning, the cleaning portion being tapered toward a distal end thereof and being composed of the core base portion and the flexible cleaning portion, wherein
the flexible cleaning portion includes a core covering portion that covers the core base portion, and a plurality of recesses that are formed due to hold pins during the insert molding,
the plurality of recesses are formed along a longitudinal direction of the core base portion, each of the recesses has a core base exposed portion with a shape elongated in an oblique direction that intersects both the longitudinal direction and a lateral direction orthogonal to the longitudinal direction, and, at a position where a dimension of the core base exposed portion in the longitudinal direction is maximum, the maximum dimension is 0.25 mm or less, and
a distance between geometric centers of the core base exposed portions of the recesses adjacent to each other in the longitudinal direction is 2.1 mm or less for allowing peeling to easily reach an adjacent recess, and allowing peeling forward from the adjacent recess to be ended with a thin, short, and neatly peeled portion after the peeling has reached the adjacent recess, even if the core covering portion is peeled from a recess that is an origin of the peeling, wherein the peeling is pulling out of the flexible cleaning portion from the core base portion originating from a position of at least one of the recesses.

2. The interdental cleaning tool according to claim 1, wherein
on a line connecting geometric centers of the core base exposed portions of the recesses adjacent to each other in the longitudinal direction, a distance between the core base exposed portions of the adjacent recesses is 0.5 mm or more.

3. The interdental cleaning tool according to claim 1, wherein
on a line connecting geometric centers of the core base exposed portions of the recesses adjacent to each other in the longitudinal direction, a distance between the core base exposed portions of the adjacent recesses is 0.5 mm or more.

* * * * *